US012731225B2

(12) United States Patent
De Jong et al.

(10) Patent No.: US 12,731,225 B2
(45) Date of Patent: Sep. 8, 2026

(54) SIGNAL CLEANER

(71) Applicant: Arm Limited, Cambridge (GB)

(72) Inventors: Irenéus Johannes De Jong, Cambridge (GB); Partha Prasun Maji, Cambridge (GB)

(73) Assignee: Arm Limited, Cambridge (GB)

( * ) Notice: Subject to any disclaimer, the term of this patent is extended or adjusted under 35 U.S.C. 154(b) by 276 days.

(21) Appl. No.: 18/682,011

(22) PCT Filed: Aug. 10, 2022

(86) PCT No.: PCT/GB2022/052081
§ 371 (c)(1),
(2) Date: Feb. 7, 2024

(87) PCT Pub. No.: WO2023/017261
PCT Pub. Date: Feb. 16, 2023

(65) Prior Publication Data

US 2024/0331106 A1 Oct. 3, 2024

(30) Foreign Application Priority Data

Aug. 13, 2021 (GB) ..................................... 2111654

(51) Int. Cl.
*G06T 5/70* (2024.01)
*G06F 21/60* (2013.01)
*G06N 3/094* (2023.01)
*G06T 5/60* (2024.01)

(52) U.S. Cl.
CPC ................ *G06T 5/60* (2024.01); *G06F 21/60* (2013.01); *G06N 3/094* (2023.01); *G06T 5/70* (2024.01); *G06T 2207/20084* (2013.01)

(58) Field of Classification Search
CPC ... G06T 5/60; G06T 5/70; G06T 2207/20084; G06N 3/094; G06N 3/09; G06N 3/047; G06F 21/554; G06F 21/60
See application file for complete search history.

(56) References Cited

U.S. PATENT DOCUMENTS

2020/0265273 A1* 8/2020 Wei ........................ G06V 10/70
2020/0285939 A1* 9/2020 Baker .................... G06N 3/088
2021/0157911 A1 5/2021 Yu

OTHER PUBLICATIONS

Athalye, Anish et al: Obfuscated Gradients Give a False Sense of Security: Circumventing Defenses to Adversarial Examples, Jul. 31, 2018 (https://arxiv.org/pdf/1802.00420.pdf).

(Continued)

*Primary Examiner* — Siamak Harandi
(74) *Attorney, Agent, or Firm* — EIP US LLP

(57) ABSTRACT

A method for filtering adversarial noise from an input signal is provided. The method comprises receiving an input signal which has an unknown level of adversarial noise. The input signal is filtered with a neural network to remove noise from the received input signal, thereby producing a filtered signal. A confidence value is calculated, the confidence value being associated with the filtered signal, and indicative of a level of trust relating to the filtered signal. The filtered signal and the confidence value may then be output.

20 Claims, 6 Drawing Sheets

(56) References Cited

OTHER PUBLICATIONS

Xu, Weilin et al: Feature Squeezing: Detecting Adversarial Examples in Deep Neural Networks, University of Virginia, evadeML.org. Network and Distributed Systems Security Symposium (NDSS) 2018, Feb. 18-21, 2018, San Diego, CA ISBN 1-1891562-49-5 (https://dx.doi.org/10.14722/ndss.2018.23198) www.ndss-symposium.org.

Mustafa, Aamir et al: Image Super-Resolution as a Defense Against Adversarial Attacks, Sep. 2, 2019 (https://arxiv.org/pdf/1901.01677.pdf).

International Search Report for International Application No. PCT/GB2022052081 dated Nov. 30, 2022.

Liao Fangzhou et al: "Defense Against Adversarial Attacks Using High-LevelRepresentation Guided Denoiser", 2018.

Siddhant Bhambri et al: "A Survey of Black-Box Adversarial Attacks on Computer Vision Models", 2020.

Zitao Chen et al: "Turning Your Strength against You: Detecting and Mitigating Robust and Universal Adversarial Patch Attack", 2021.

* cited by examiner

SIGNAL CLEANER

TECHNICAL FIELD

The present disclosure relates to systems, methods and apparatuses for filtering adversarial noise. In particular, the present disclosure relates to a signal cleaner which filters out noise from an input signal and provides an indication of a level of trust relating to the filtered signal.

BACKGROUND

Advances in Machine Learning has led to Machine Learning systems being integrated into more and more domains, such as Autonomous Cars, Computer Vision, Virtual and Augmented Reality, Smart Assistants, Biometric Authentication (such as facial recognition) and many others. This growing popularity lies in Machine Learning's ability to process complex input signals and data, and then provide actionable outputs.

Unfortunately, with the growing popularity of Machine Learning, there has been a corresponding increase in adversarial threats, which seek to exploit vulnerabilities in existing Machine Learning processes. One such threat which is rapidly rising is the use of adversarial noise attacks, in which an input signal is modified in such a way as to force a misclassification, or even target a specific misclassification. Moreover, the very existence of these attacks, even if not successful, calls into question whether the output of a particular system can be trusted.

Such attacks are being targeted at Machine learning algorithms, and in particular neural networks, which can be very susceptible to the introduction of adversarial noise. More generally, many different types of signal-processing pipeline may be targeted by adversarial noise attacks. It is therefore desirable to find systems and methods which can reduce the vulnerability of signal-processing pipelines and Machine Learning systems to adversarial noise attacks and increase the confidence in the signals being received by such systems.

SUMMARY

According to a first aspect of the present disclosure, there is provided a method for filtering adversarial noise, comprising: receiving an input signal which comprises an unknown level of adversarial noise; filtering the received input signal with a neural network to remove noise from the received input signal, thereby producing a filtered signal; calculating a confidence value associated with the filtered signal, indicative of a level of trust relating to the filtered signal; and outputting the filtered signal and the confidence value.

According to a second aspect of the present disclosure, there is provided a signal filter for filtering adversarial noise comprising: a processor; and a memory comprising machine readable instructions which, when read by the processor, cause the processor to perform the method of the first aspect.

According to a third aspect of the present disclosure, there is provided a non-transitory computer-readable storage medium comprising instructions which, when read by a processor, cause the processor to perform the method of the first aspect

BRIEF DESCRIPTION OF THE DRAWINGS

Further features and advantages will become apparent from the following description of preferred examples, given by way of example only, which is made with reference to the accompanying drawings in which like reference numerals are used to denote like features.

DETAILED DESCRIPTION

Figure 1:
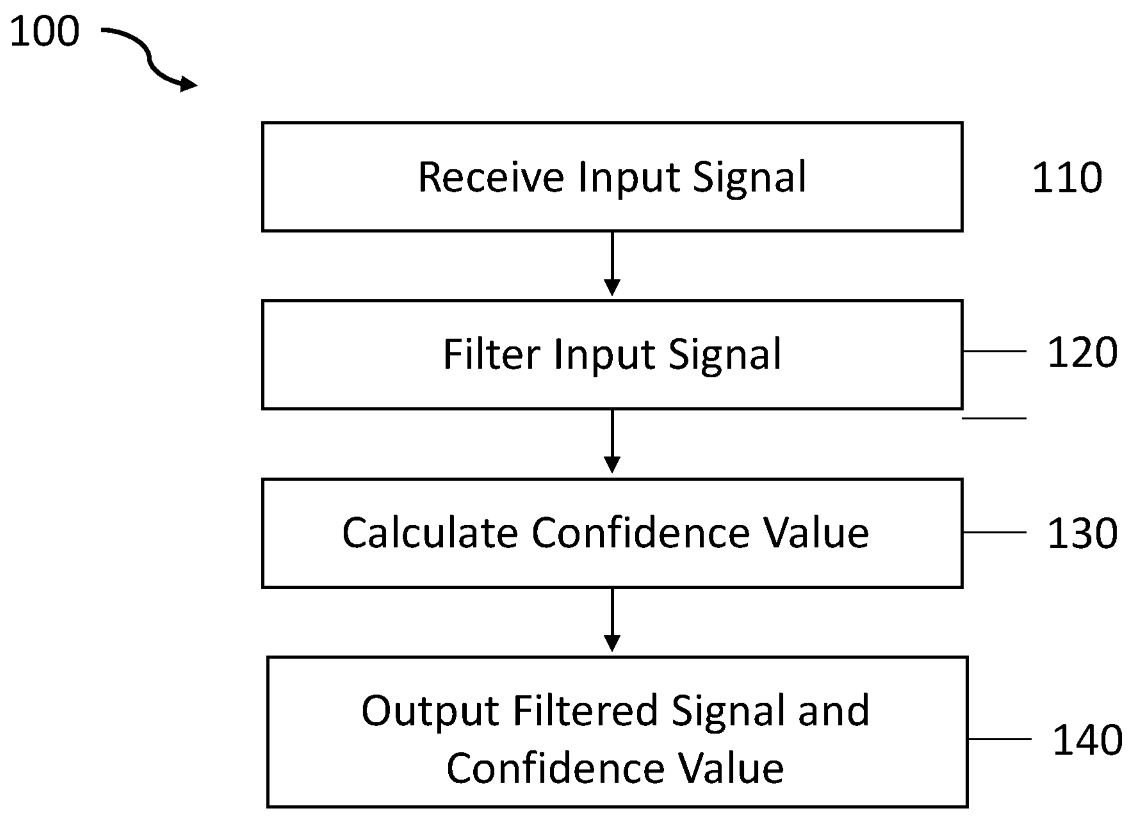
FIG. 1 is a flow diagram illustrating a method according to an example.

Details of systems and methods according to examples will become apparent from the following description with reference to the Figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Certain examples described herein provide systems, methods and apparatuses for filtering adversarial noise from an input signal. Examples are described which provide a verification as to whether a particular input signal should be trusted. The examples provided herein can significantly reduce the level of noise (including adversarial noise) in a given signal and/or significantly increase the effort needed to construct an adversarial signal, whilst improving the confidence in the input signal.

An adversarial noise attack may be summarized as an attack in which an attacker has constructed a specific noise pattern and added it to an image that is to be processed by a Machine Learning system/signal-processing pipeline, in order to force a misclassification. To construct this noise pattern the attacker generally looks for the smallest input change they can make which maximizes the loss of the image processing system.

Adversarial noise patterns may be constructed in various different ways. Adversarial noise patterns targeted at Neural Networks may focus on attacking the training process of the network, using techniques such as data poisoning, data injection and logic corruption. Other attacks may focus on the inference side of the neural network, using techniques such as white box and black box attacks. At the very least the attacker will need sufficient access to the system to be able to observe and modify the input signal and observe the output in order to construct a successful adversarial noise attack.

Previously proposed techniques to mitigate such adversarial noise attacks vary both in their approach and their effectiveness. One such approach focusses on masking the gradient in the neural network, to make finding the minimum change needed to cause a misclassification hard. However, various adversarial attacks techniques exist to counter such gradient masking, which estimate the gradient of the network during the attack. This means that gradient masking is not always an effective defense in practice Additionally, or alternatively, filtering the noise from the input signal has been proposed as a defense against adversarial noise attacks. Specifically, various auto-encoder and feature-squeezing methods have been proposed which may reduce the level of adversarial noise in input signals. Such techniques not only sanitize the input signal, but also remove the ability for the attacker to be certain if a particular perturbation added to the input signal did cause a change in the output of the network.

Whilst gradient masking and noise filtering have proven to be effective in certain situations, neither technique provide any confidence in the masked/filtered signal. There are no known techniques which provide an indication as to the level of trust that should be assigned to the altered input signal, said level of trust being indicative of, for example, whether all adversarial noise has been removed from the input signal and/or whether any original features have been removed. It would therefore be advantageous to provide techniques which remove adversarial noise and provide an indication of a level of trust.

FIG. 1 illustrates a first method for filtering adversarial noise in accordance with an example. At a first step 110, an input signal is received, which comprises an unknown level of adversarial noise. The input signal may comprise any level of adversarial noise, including no adversarial noise, without requiring any changes to how the method processes the input signal.

Once an input signal has been received, the input signal is filtered at step 120 to remove at least part of any noise present in the received input signal, thereby producing a filtered signal. The received input signal may comprise no noise. Similarly, the input signal may comprise noise which is not adversarial in nature (which may have been introduced for example by transmission errors, transmission disruption, or any other known source of noise). The input signal may in addition, or alternatively, comprise adversarial noise deliberately introduced by an attacker in an attempt to disrupt or confuse the systems otherwise intended to process the input signal.

At step 120, the received input signal is processed with a neural network to remove some or all of the noise present in the input signal, including (if present) adversarial noise. The neural network filtering the input signal may comprise an autoencoder, and/or a feature squeezer, and/or be implemented as, a convolutional neural network, a U-net or a super-resolution network. In addition, the neural network may further comprise, in addition or as an alternative, any alternative known method of filtering noise from an input signal.

To improve the neural network's ability to filter noise, the neural network may have been previously trained on data with varying degrees of noise added, which the network was trained to remove. This training noise may comprise common noise patterns seen in the expected input signal, commonly known noise patterns, known adversarial noise patterns, and/or previously encountered adversarial noise patterns. The neural network may also have trained with a data set comprising adversarial noise patterns that would likely be created by commonly used attack methods, such as a Fast Gradient Sign Method.

When new adversarial noise patterns are encountered, or become known as a threat that may be encountered, the neural network may be re-trained with the new adversarial noise patterns in an effort to ensure that the method evolves to adapt to new adversarial noise attacks as they emerge.

Furthermore, in situations where a probabilistic output is preferred, the neural network may be implemented as a probabilistic neural network, for example by implementing the network as an ensemble, using MC dropout, by latent variable sampling, or by making use of a Bayesian neural network.

Once the signal has been filtered at step 120, a confidence value associated with the filtered signal is calculated at step 130. The confidence value mathematically expresses the confidence in the filtered result. In essence, this confidence value provides an indication as to whether the filtered signal can be trusted. This level of trust may be used as an indication of whether all noise has been removed from the input signal, and/or whether any original feature(s) of the input signal has been removed by the filtering process.

The confidence value may be represented mathematically using any range of values. For example, the confidence value may be represented with mathematical values between 0 and 1, with 0 being indicative of zero trust, and 1 being indicative of 100% trust in the filtered result. The confidence value may be calculated by the same neural network which filtered the input signal at step 120, or by a second process, such as a second neural network trained to calculate confidence values.

The confidence value may be used by any system which is to further process the filtered input as an indication as to whether and to what extent to trust the filtered signal. Highly secure systems, such as security and banking systems, may choose to accept and/or process filtered signals with very high associated confidence values (90%, 95%, 99%, 100% etc)—as these systems wish to ensure that all or most noise has been removed without significant original features having been removed. Whereas systems which are less concerned with data security, such as general image classifiers and language processing systems, may choose to accept and/or process filtered signals with lower confidence values—as these systems may be more accepting of missing features and/or a level of remaining noise. Thus, the confidence value enables systems to have an insight into whether a particular filtered signal should be trusted.

In order to provide an indication as to whether any features have been removed, the calculated confidence value may comprise a similarity measure indicating how similar the filtered signal is to the original input signal and/or the data the neural network was trained on.

Additionally, or alternatively, the confidence value may represent the level of confidence that no noise remains in the filtered signal. This may be calculated by, for example, calculating the maximum uncertainty for any pixel or group of pixels in an image, or by calculating an average uncertainty per pixel. Higher uncertainty in each case may be indicative of a pattern that has not been encountered by the neural network either often or at all during its training process and could be indicative of an adversarial noise pattern. Optionally, an uncertainty per pixel could be calculated which could be used to prevent an inference being made based on the most uncertain pixels in the image data. Any other known method of calculating a confidence value for a filtered input signal may be used.

After step 130, the filtered signal and the confidence value is output at step 140. In some examples, the filtered signal and the confidence value may be output regardless of what the confidence value is. As an alternative, the confidence value may be compared to a predetermined threshold confidence value. In this case, the filtered signal may only be output if the confidence value is greater than or equal to the predetermined threshold confidence value.

As a further alternative, if the confidence value is less than the predetermined threshold confidence value, an alarm signal may be generated which is output along with the filtered input signal and the confidence value. This alarm signal may be used by any further process as an indication that the filtered input signal has a relatively low confidence value and should thus be processed carefully or discarded.

The method described above may be implemented as a standalone method of filtering input signals as part of a signal and data processing pipeline, and thus the filtered signal and the confidence value are output to the next processing step in the pipeline. Alternatively, the method may be integrated into a larger data processing machine learning system as an initial input filter. Similarly, the filtered signal and the confidence value may be output to any suitable data transmission system which is suitable for transmitting the filtered signal type.

Figure 2:
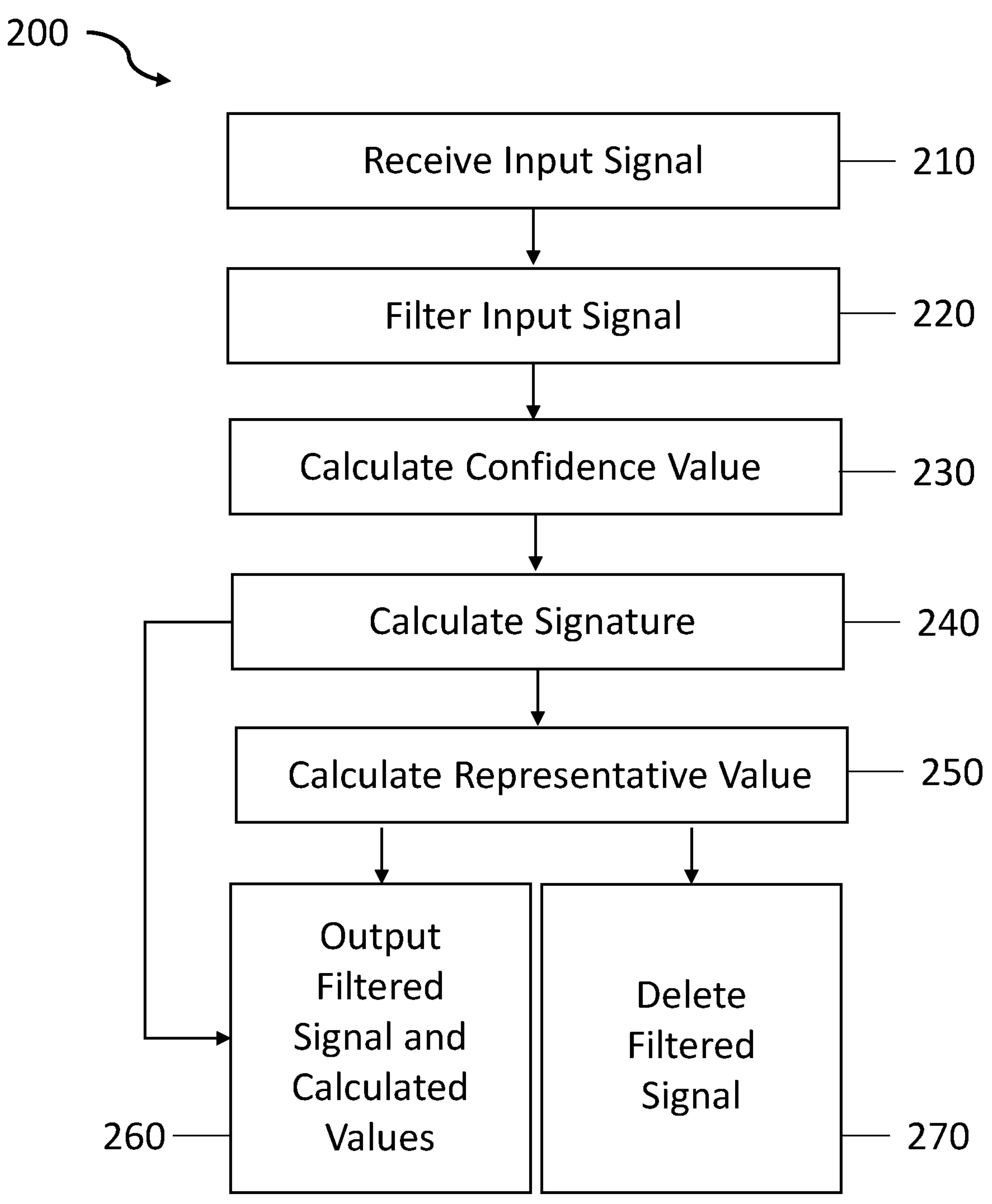
FIG. 2 is a flow diagram illustrating a method according to an example.

FIG. 2 illustrates a further method in accordance with an example, which expands on the method of FIG. 1. The method initially follows the same steps described as for FIG. 1, in receiving an input signal 210, filtering the input signal 220, and calculating a confidence value associated with the filtered signal 230. These steps may be performed in accordance with any of the methods set out above in relation to FIG. 1.

Optionally, in a further step 240 a signature may be calculated for the filtered signal and/or the calculated confidence value. Once generated, the signature may be output with the filtered signal, and/or output separately to the filtered signal. The signature may be used to ensure the integrity of the filtered signal by enabling later processes to check whether the filtered signal has been tampered with. Any known method of generating signatures may be used. For example, the filtered data may be hashed to form a signature, and/or a checksum may be calculated and used as the signature.

The provision and use of such signatures may be particularly useful in systems which are open to further input after the above described methods are run, or in systems where a feature squeezer (used to further harden networks against adversarial attacks) is run in a different part of the system than the machine learning function. Once the signature is calculated, the filtered signal and signature may be output at step 260.

Additionally, or alternatively, in further optional step 250, a representative value may be calculated. The representative value is indicative of how representative the filtered signal is to the original input signal. Whilst the confidence value described above may provide an indication as to the similarity of the filtered signal to the input signal, in some cases it may be beneficial to calculate a further value which is solely indicative of how representative the filtered signal is to the input signal. This representative value may comprise, for example, a similarity value or a difference value, indicating the level of similarity or difference between the filtered signal and the originally received input signal.

The representative value may be compared against a predetermined threshold. For example, the representative value may be compared against a predetermined threshold similarity value, which is indicative of an acceptable level of similarity between the filtered signal and the input signal. Similarly, the representative value may be compared against a predetermined difference value, which is indicative of an acceptable level of difference between the filtered signal and the input signal.

If the filtered signal is deemed to be too dissimilar or too different, based on comparison of a representative value to a predetermined threshold, the input signal may be considered to have too much noise. Such a determination may also indicate that a significant (non-noise) feature may have been filtered out from the input signal at step 220. Consequently, at step 250, if the representative value falls below the predetermined threshold, the method may delete the filtered signal at step 270. Whilst deleting filtered signals in this manner may reduce the quality of service by reducing data transmission and/or forcing retransmission, this reduction in quality of service may be preferable to letting signals with unfiltered noise and/or deleted features through.

Optionally, at step 270, if the filtered signal is deemed to be too dissimilar or too different, based on comparison of a representative value to a predetermined threshold, the method may further comprise sending an alarm signal. The alarm signal is indicative of an input signal having been received with too much noise and/or in which too many original features have been removed, thereby letting other systems know that an input signal was received but it was not further transmitted due to the level of noise detected in the system.

Returning to step 250, if the representative value is sufficiently high in comparison to the predetermined threshold, the filtered signal may be output at step 260. Optionally, the representative value and/or a signature may also be output at step 260 along with the filtered signal and the confidence value.

Additionally, at step 260, if a non-zero level of noise was detected in the input signal (for example as indicated by a non-zero difference value, or a non-perfect similarity value, or a non-perfect representative value), an alarm signal may be output along with the filtered signal. The alarm signal may be used by other parts of a system processing the input signal to indicate that the received input signal has been changed from what was received. This change being indicative of noise in the input signal.

In the above described examples, the filtered signal is analyzed and in certain circumstances, the filtered signal may have been deleted in its entirety, if the level of noise in the input signal is too high and/or if important features are likely to have been filtered from the input signal during processing. It has been recognized however that in many cases noise may affect a signal evenly. In many cases, significant portions of the input signal may be unaffected by noise, yet the signal as a whole may still be deleted by the above described methods. As an alternative to the above described methods, where sufficient processing capacity is available, the input signal may be analyzed in greater detail and portions of the input signal may be output whilst other portions are deleted.

In this further example, the input signal may be divided into two or more segments and additional confidence values may be calculated for each segment. These additional confidence values may supplement the confidence value calculated for the input signal, as described above, or be used instead of said confidence value. To aid understanding, the following example will presume that the input signal is an image. However, the following method can be applied to any suitable data type.

The input signal segments may be of any size, depending on the size of the input signal and the computing resources available to process the input signal. In some cases, the segment size may correspond to the pixel size, meaning each individual pixel in an image is assigned a confidence value. Alternatively, pixels may be grouped to reduce the processing power required, with each group of pixels being assigned a value representing the pixels within the group, such as an average, maximum or minimum value.

Once the additional confidence values have been calculated, each additional confidence value may be compared to a predetermined threshold value. For each segment the threshold comparison step may be used to decide whether or not to output that particular segment. This further example thus enables the filtered signal to be output only in part, with only those segments having an additional confidence value meeting the threshold requirements being output.

Alternatively, the whole filtered input signal may be output in conjunction with an additional signal which is indicative of the different additional confidence values. This enables any further process to decide which portions of the filtered input signal to accept and/or process. One option for this additional signal will now be described with reference to FIGS. 3 and 4.

Figure 3:
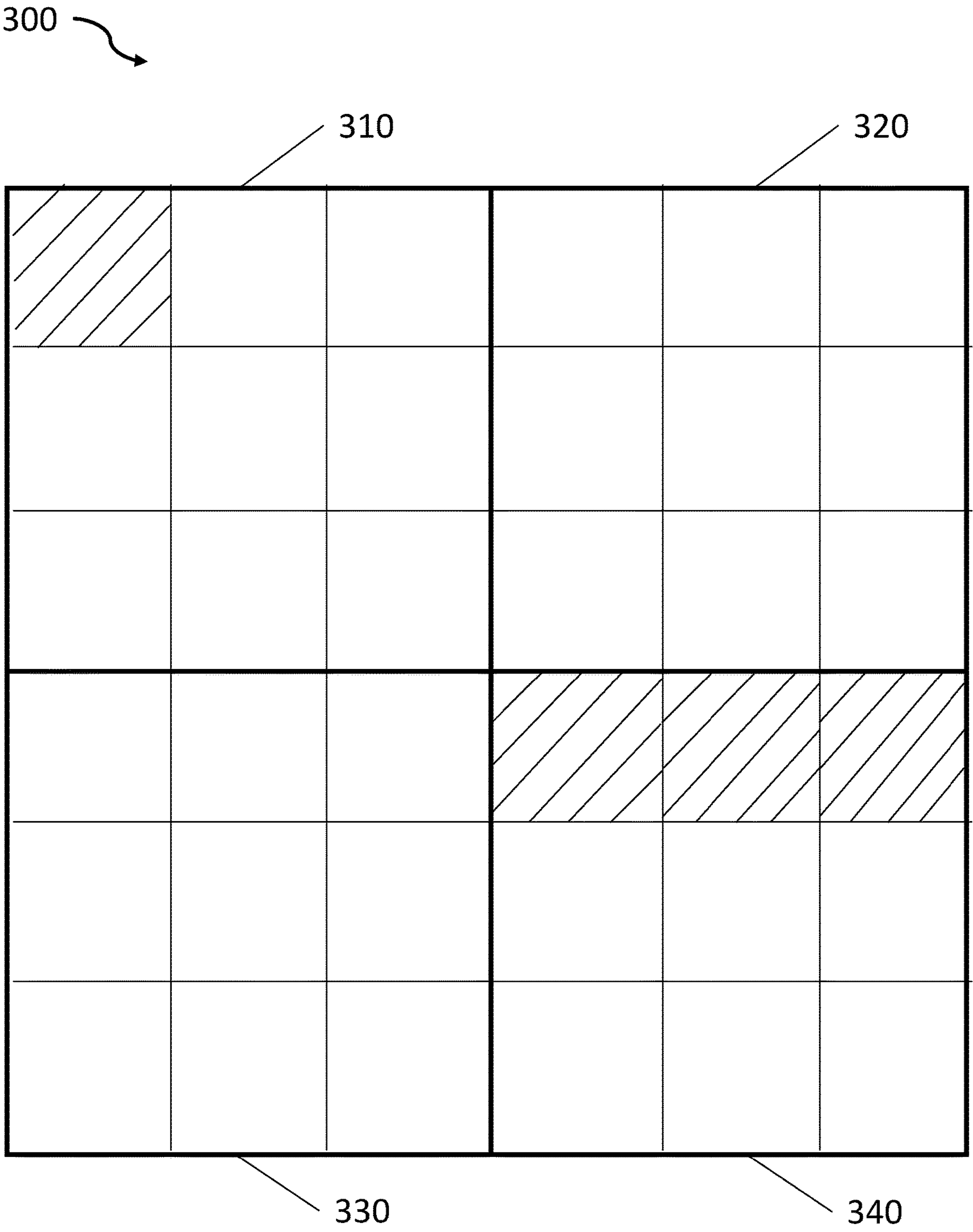
FIG. 3 is a schematic representation of a filtered signal in accordance with an example.

FIG. 3 illustrates a simple representation of a filtered signal 300, which in this example is an image made up of 36 pixels (represented by a 6×6 grid of boxes). Filtered signal 300 has been divided into four segments 310, 320, 330 and 340, each segment made up of 9 pixels. In this example, adversarial noise was added to the input signal which was filtered to produce filtered signal 300, resulting in four pixels (as illustrated by line hatching) having been filtered out to create filtered signal 300—one filtered pixel in segment 310 and three filtered pixels in segment 340.

Following the methods described in relation to FIGS. 1 and 2, the addition of four adversarial pixels to an input signal comprising 36 pixels may be considered to be a level of adversarial noise which is too high to be able to filter the adversarial noise without removing important image features. Thus, filtered signal 300 may have been deleted. However, following the segmentation method, in this simple example, at least half of the filtered signal can be output, as none of the pixels in segments 330 and 320 were affected by the filtering step.

Segment 310, containing only one filtered pixel out of nine pixels in the segment, may still have a sufficiently high confidence value (in comparison to a threshold confidence value) to warrant outputting and thereafter further analysis, as any important feature in segment 310 may still be recoverable. Thus, segment 310 may also be output. By contrast, segment 340 having three filtered pixels out of 9 may have a confidence value below the threshold confidence value, and the input data relating to segment 340 may be deleted and/or not output. In this manner, three quarters of the filtered data may be output, with all output data having a relatively high confidence value. Consequently, whilst additional computer processing resources are required, a larger amount of noisy data can be processed and output whilst maintaining confidence in the filtered signal, using the segmentation method.

Figure 4:
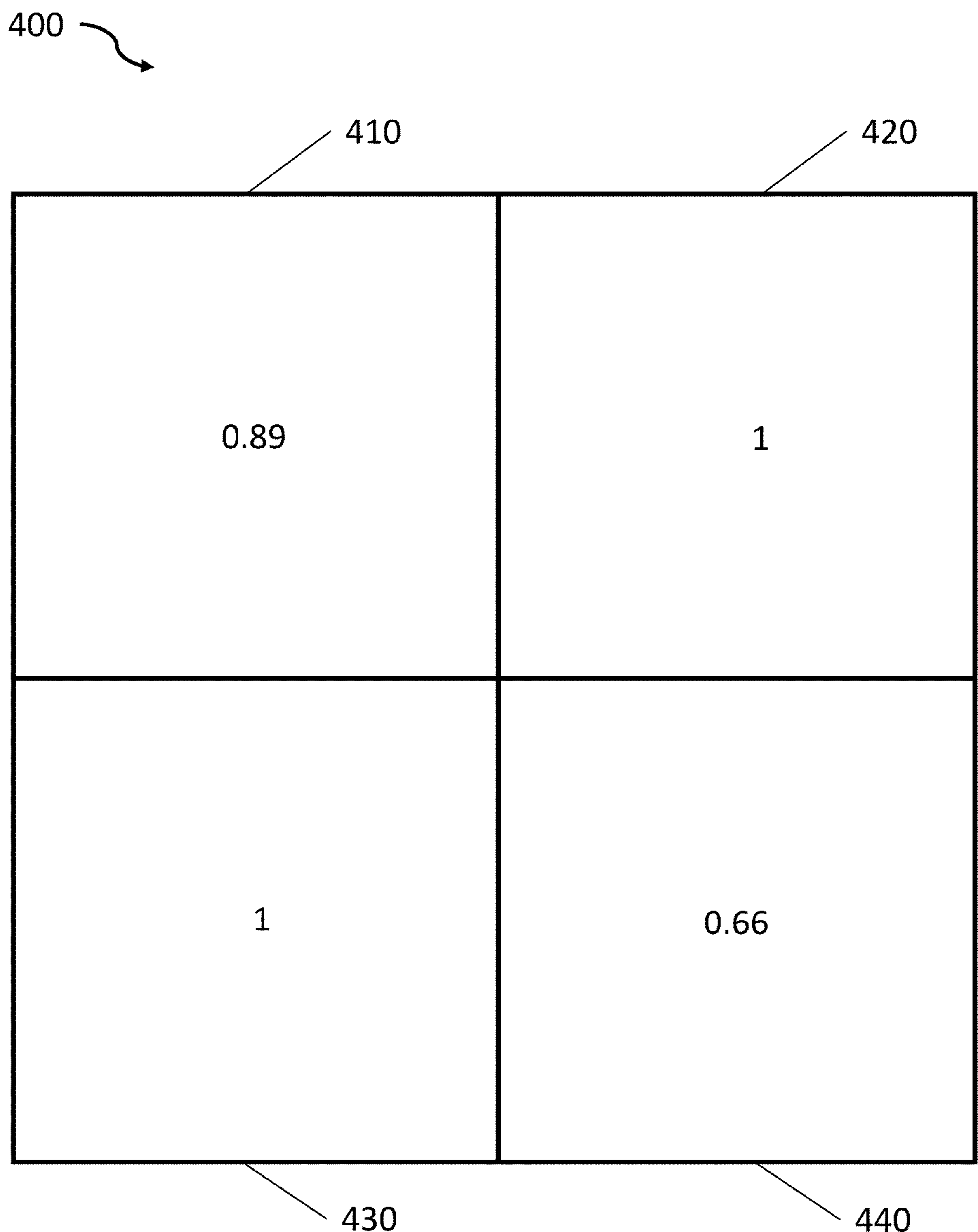
FIG. 4 is a schematic representation of a probabilistic confidence map in accordance with an example.

Having calculated the additional confidence values, it is possible to generate a probabilistic confidence map, which illustrates the additional confidence values associated with different segments of the filtered data. FIG. 4 illustrates a simple probabilistic confidence map 400 which corresponds to filtered signal 300 of FIG. 3.

FIG. 4 has four sections 410, 420, 430 and 440, which respectively correspond to segments 310, 320, 330 and 340 of FIG. 3. Each section has been labelled with a probabilistic confidence value between 0 and 1, with the value being indicative of confidence in the data within that section; where a value of 1 represents total confidence and a value of 0 represents zero confidence.

As FIG. 4 illustrates, sections 420 and 430, which correspond to segments 320 and 330 which had no filtered pixels, may have associated confidence values of 1. Sections 410 which had one filtered pixel may have a correspondingly lower confidence value, in this example of 0.89. Section 440, which had three filtered pixels, may have an even lower confidence value, in this example of 0.66. Thus, the probabilistic confidence map provides an easy to understand representation of the confidence in different sections of filtered input data.

The probabilistic confidence map may be output with some or all of the filtered input data, to enable further systems to easily understand how confidence changes in different sections of the filtered input data. Whilst FIG. 4 makes use of a simple numerical value, any other suitable representation of a confidence value may be used. For example, vector notation may be beneficial for use in systems where further computational processing is expected. Whereas a more visual representation (such as colour coding) may be beneficial for use in systems where the probabilistic confidence map is likely to be output to a human.

The above described methods describe providing a signal filter for filtering adverse noise from a wide range of possible input signals. One possible application for the above described signal filter is in image recognition. Image recognition is widely used for many different applications, including for example facial recognition for security applications (i.e. facial recognition to enable the unlocking of mobile phones, cars, security systems and the like). Such security related applications may be particularly valuable targets for adverse noise attacks.

Figure 5:
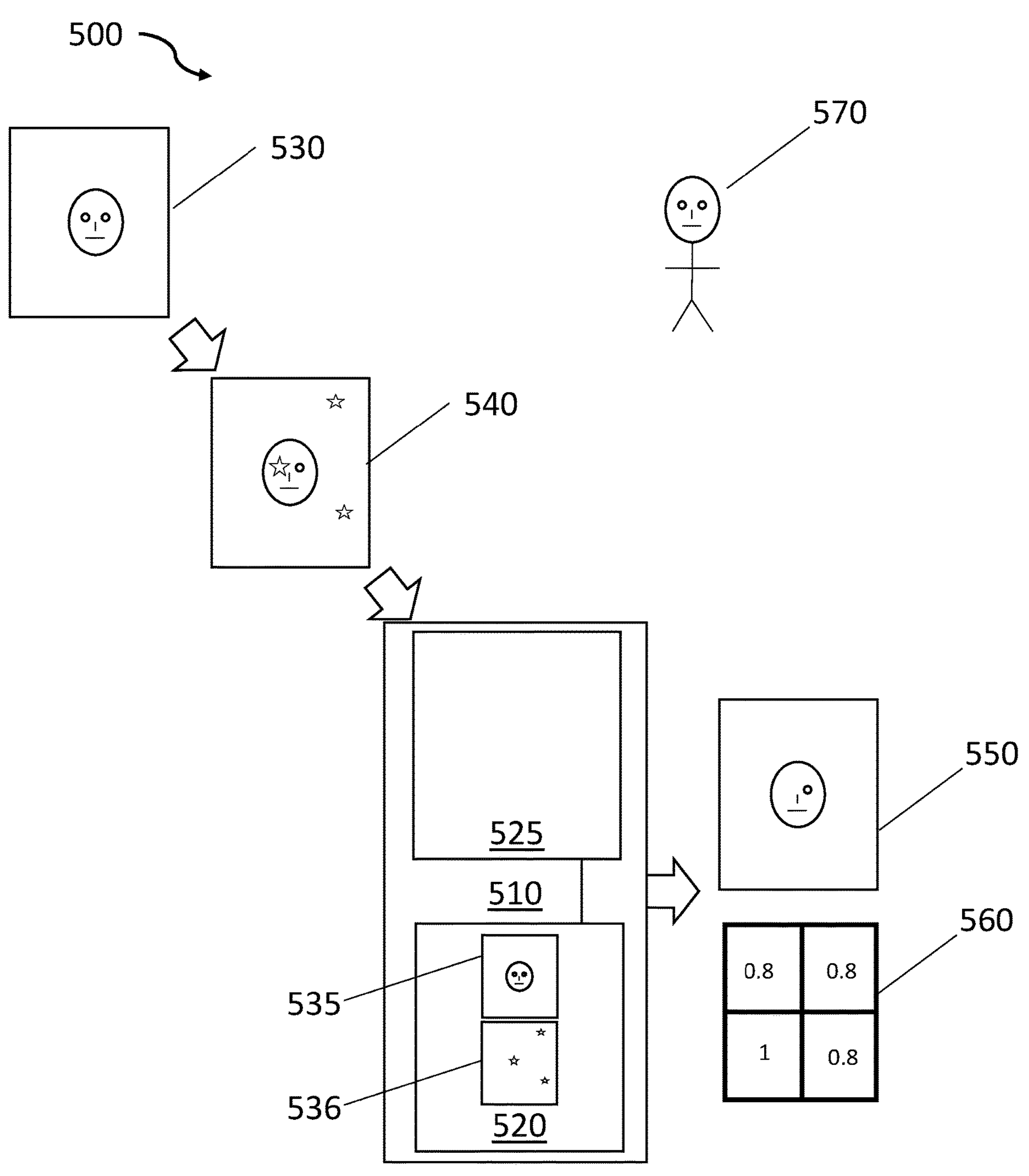
FIG. 5 is an illustration of a signal filter apparatus in accordance with an example.

FIG. 5 schematically illustrates how one such adversarial noise attack may be attempted. In FIG. 5 an apparatus 510 is illustrated which may be used, for example, to decide whether to allow access to a secured system, such as locked mobile phone or a locked car. Apparatus 510 comprises a memory 520 and a processor 525, with which a neural network is implemented, the neural network having been trained to decide whether or not to enable access to the secured system based on received input signals.

The neural network 510 has been trained to accept a particular range of inputs for unlocking the security system, which may all correspond to a particular authorized user 570. In use, variations to the input signal are to be expected as the system is likely to be used in a wide variety of environments, and the authorized user is likely to change appearance (for example due to lighting effects, distance to a camera, growth of hair and the like). Thus, the neural network will have been trained to unlock the security system in response to a range of different inputs.

This training to accept a particular range of inputs has been represented in memory 520 by a representation 535 of the authorized user 570. This is intended to be a schematic representation only, as a neural network would recognize acceptable inputs in a different manner (for example with the weightings applied to different layers/nodes in the neural network during training). In addition, an expected pattern of adversarial noise 536 has been schematically illustrated in memory 520, which is also intended only to be a visual reference, not a literal representation of how patterns may be stored.

FIG. 5 also shows a first input 530 which would, in normal circumstances, cause the apparatus 510 to unlock the security system, as it corresponds to a true representation of authorized user 570. The first input 530 is an image capture of the authorized user 570 by an imaging device (not shown). In this example, between the first input 530 being captured and it being received by apparatus 510, the first input 530 has been intercepted and adversarial noise added to the image, as shown by second input 540. The adversarial noise is illustrated by the addition of three star shapes which have been overlaid on the original input. This addition of additional information is the adversarial noise attack.

In this example, the attacker is attempting to cause a misclassification in the neural network of apparatus 510, which will cause the apparatus not to recognize the input as a true representation of authorized user 570, and therefore prevent the security system from being unlocked. There may be several reasons for creating such adversarial attacks, from simply trying to cause frustration to the authorized user, to more maliciously attempting to cause the authorized user to relax security protocols and/or re-train the security system (which may then open up further attacks).

Regardless of the motivations behind the attack, in the present example, apparatus 510 receives the second input 540 (comprising an unknown level of adversarial noise). Once the second input 540 is received, the apparatus 510 may implement any of the above described signal filter methods, in order to filter the input signal and prevent the attack from succeeding.

A first option for apparatus 510 to filter the adversarial noise is to compare the received input 540 with expected input 535, and remove any differences between the two inputs, to produce filtered input 550. Alternatively, or in addition, apparatus 510 may recognize the pattern of the adversarial noise that has been applied to the first input 530, as it corresponds to expected pattern of adversarial noise 536. Thereafter, apparatus 510 may remove the expected pattern of adversarial noise 536 from the received input 540 to produce (in this case) the same filtered input 550.

Once filtered input 550 has been produced, apparatus 510 can produce a confidence value, or confidence values, which represent how confident the apparatus is that all adversarial noise has been removed and/or how confident the apparatus is that no important feature has been removed, and/or the similarity or difference between the input image and the expected image, and/or how confident the apparatus is that the filtered input 550 is representative of authorised user 570. In the present example, a probabilistic confidence map 560 has been produced which shows the similarity between four sections of the filtered input 550 and the expected input 535.

In the above example, the filtered input 550 and the probabilistic confidence map 560 have been illustrated as being output externally to apparatus 510 (which may enable further decisions and/or analysis to be performed on the data). Before being output, the apparatus 510 may store the filtered input 550 and/or the probabilistic confidence map 560 in memory 520, and if necessary, use the data for further analysis and/or decision making. In the present example, apparatus 510 may use the filtered input and the probabilistic confidence map to decide if the apparatus is confident enough that received input 540 is a true representation of the authorized user 570, and therefore unlock the associated security system despite the adversarial noise attack.

In this simple example, filtered input 550 is illustrated with any feature replaced by adversarial noise (the star shapes of second input 540) having been removed. The remaining features of filtered input 550 provide apparatus 510 with sufficient information to enable the apparatus to verify that the filtered input 550 is representative of the user 570. Moreover, the confidence values in the probabilistic confidence map 560 provide the apparatus 510 with sufficient trust in the filtered input 550 to make the decision to unlock the associated security system, thereby thwarting the adversarial noise attack. Whereas, without the confidence values, system 510 would not have sufficient information to know whether or not to trust the filtered input 550, and thus the adversarial noise attack may have succeeded.

Figure 6:
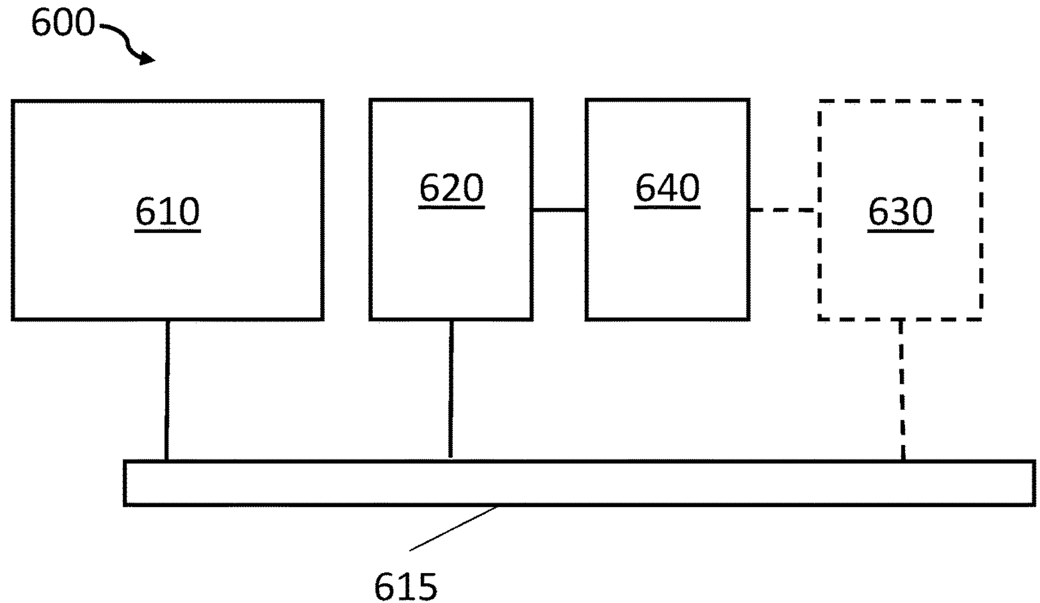
FIG. 6 is a schematic representation of a signal filter apparatus in accordance with an example.

An example of a signal filter apparatus 600 for use with the methods described herein is shown schematically in FIG. 6. The signal filter apparatus 600 of FIG. 6 may be coupled to or form part of a computer device, such as a personal computer, a laptop, a smartphone or an on-board computer device which may be coupled to or mounted within a vehicle such as a car. Furthermore, the signal filter apparatus 600 may also be implemented as part of a server or cloud computing environment.

The signal filter apparatus 600 of FIG. 6 includes an input 610. Input 610 may be a wired or wireless connection suitable for receiving input data from an external source. Alternatively, input 610 may be a sensor such as an image or audio sensor suitable for capturing images or sound from an environment in which the apparatus is present. When input 610 is an image sensor, it will typically include an array of sensor pixels, which may be any suitable photosensor for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). An image capture by input 610 may form part of a video, which is typically a series of images captured sequentially.

In FIG. 6, input 610 is arranged to send received input data to a central processor unit (CPU) 620 via a common systems bus 615. CPU 620 may be used to implement the neural networks described above. Additionally, signal filter apparatus 600 may also include one or more neural network accelerators 630. A neural network accelerator is, for example, a processor dedicated to implementing at least classification of data using a neural network. The at least one neural network accelerator may be configured to implement neural networks such as those described above.

In other examples, though, the signal filter apparatus 600 may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The signal filter apparatus 600 may also or alternatively include a processor implemented as a combination of computing devices, e.g., a combination of a DSP and a microprocessor, a plurality of microprocessors, one or more microprocessors in conjunction with a DSP core, or any other such configuration. The signal filter apparatus 600 may also or alternatively include at least one graphics processing unit (GPU). The neural network(s) described herein may be implemented by one or more of these other processors in examples.

The signal filter apparatus 600 of FIG. 6 also includes storage 640. The storage 640 is for example external to the CPU 620 and the optional neural network accelerator. The storage 640 may be a random access memory (RAM) such as DDR-SDRAM (double data rate synchronous dynamic random access memory). In other examples, the storage 640 may be or include a non-volatile memory such as Read Only Memory (ROM) or a solid state drive (SSD) such as Flash memory. The storage 640 in examples may include further storage devices, for example magnetic, optical or tape media, compact disc (CD), digital versatile disc (DVD) or other data storage media. The storage 640 may be removable or non-removable from the computing system 640. The storage 640 is for example arranged to store input data received by input 610. In some examples, the signal filter apparatus 600 of FIG. 6 may also include a dynamic memory controller (DMC) which may be used to control access to the storage 640.

The components of the signal filter apparatus 600 in the example of FIG. 6 are interconnected using a common systems bus 615. This allows data to be transferred between the various components. The bus 615 may be, or include, any suitable interface or bus. For example, an ARM® Advanced Microcontroller Bus Architecture (AMBA®) interface, such as the Advanced extensible Interface (AXI), may be used.

Figure 7:
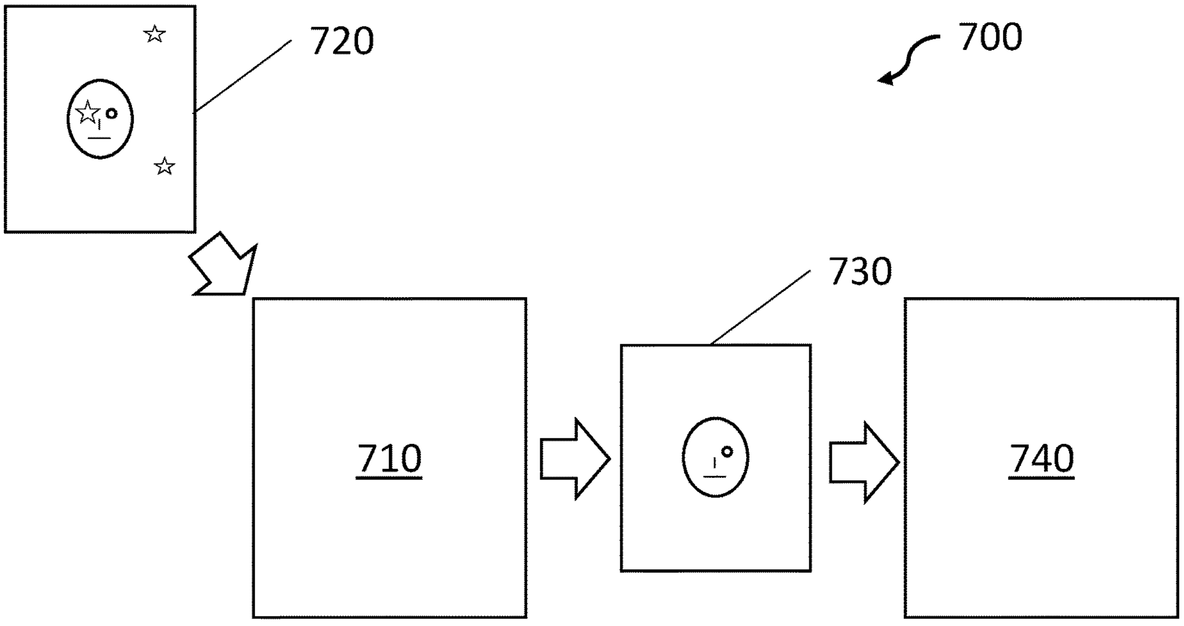
FIG. 7 is a system diagram illustrating a system suitable for implementing the methods described herein.

FIG. 7 illustrates an example distributed system which may perform one or more of the methods described above. The system of FIG. 7 comprises a signal filter apparatus 710. The signal filter apparatus 710 corresponds to the signal filter apparatus 600 described above. The signal filter apparatus 710 is adapted to receive input signal(s) 720, which may comprise adversarial noise. The signal filter apparatus 710 is also adapted to process received input signal(s) 720 in the manner(s) described above and output filtered input signal(s) 730.

The system further comprises a signal processing unit 720. The signal processing unit 720 comprises a memory and a processor adapted to receive filtered input signal(s) and thereafter perform further processing tasks on the filtered signal. The signal processing unit may operate a second neural network to perform these further processing tasks. The processing tasks may include any computational task that could be performed on the original input signal, such as image recognition, object recognition, natural language processing, and so forth.

In the example shown in FIG. 7, the signal filter apparatus is shown as a standalone apparatus which can be used to filter some or all of the input signals which would otherwise be received by signal processing unit. The signal filter apparatus 710 may further be adapted to output filtered input signals to multiple signal processing units, for example in a hub and spoke system model.

The above examples focus on the removal of adversarial noise from input signals. However, many input signals will comprise non-adversarial noise, and it is intended that the above described methods may be applied to remove non-adversarial noise in addition to, or instead of, adversarial noise. In such cases confidence value(s) associated with a level of trust in these filtered signals may still be provided and usefully used to provide confidence in the filtered signals.

The above examples are to be understood as illustrative examples of the present disclosure. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

What is claimed is:

1. A method for filtering adversarial noise, comprising:
receiving an input signal which comprises an unknown level of adversarial noise;
filtering the received input signal with a neural network to remove noise from the received input signal, thereby producing a filtered signal;
calculating a confidence value associated with the filtered signal, indicative of a level of trust relating to the filtered signal; and
outputting the filtered signal and the confidence value together to one or more systems for further processing the filtered signal, wherein the confidence value provides the one or more systems with an indication of a level of trust to assign to the filtered signal.

2. The method of claim 1, wherein the neural network comprises one or more of an autoencoder, a feature squeezer, a U-net or a super resolution network.

3. The method of claim 1, wherein the neural network is a probabilistic neural network implemented as an ensemble, as a Bayesian neural network or implementing Monte Carlo dropout analysis or latent variable sampling on the filtered signal.

4. The method of claim 1, wherein filtering the received input signal comprises comparing the received input signal to an expected input signal and removing any parts of the received input signal which do not correspond to the expected input signal, wherein the expected input signal was taught to, or learned by, the neural network based on neural network training data.

5. The method of claim 1, wherein filtering the received input signal comprises comparing the received input signal to known adversarial noise patterns and removing any parts of the received input signal which correspond to a known adversarial noise pattern, wherein the adversarial noise patterns were taught to, or learned by, the neural network based on neural network training data.

6. The method of claim 1, wherein the confidence value is indicative of: a remaining level of adversarial noise in the filtered signal; how similar the filtered signal is to the input signal; how similar the filtered signal is to the neural network's training data; or the detection of a pattern of adversarial noise in the input signal which has been previously encountered by the neural network during training.

7. The method of claim 1, further comprising:
comparing the calculated confidence value with a predetermined confidence threshold value; and
only outputting the filtered signal and confidence value if the calculated confidence value is greater or equal to the predetermined confidence threshold value.

8. The method of claim 1, further comprising:
comparing the calculated confidence value with a predetermined confidence threshold value;
if the calculated confidence value is less than the predetermined confidence threshold value, generating an alarm signal; and
outputting the generated alarm signal.

9. The method of claim 1, wherein the input signal comprises image data.

10. The method of claim 9, wherein calculating the confidence value comprises calculating uncertainty values for pixels within the image data.

11. The method of claim 9, wherein calculating the confidence value comprises calculating an average uncertainty or a maximum uncertainty for pixels or groups of pixels in the image data.

12. The method of claim 9, further comprising:
calculating additional confidence values for the filtered signal, wherein each additional confidence value corresponds to a pixel or group of pixels in the image data;
comparing each additional confidence value to a predetermined confidence threshold value; and
outputting only parts of the filtered signal corresponding to pixels or groups of pixels having an additional confidence value that is equal to or greater than the predetermined confidence threshold value.

13. The method of claim 9 further comprising:
generating a probabilistic confidence map for the filtered signal, wherein the probabilistic confidence map maps the additional confidence values to pixels of the input signal; and
outputting the probabilistic confidence map with the filtered signal.

14. The method of claim 1, wherein the neural network is trained with data comprising adversarial noise.

15. The method of claim 1, further comprising:
calculating a signature for the filtered signal; and
outputting the signature with the filtered signal.

16. The method of claim 1, further comprising:
calculating a representative value which is indicative of how representative the filtered signal is of the input signal;
comparing the calculated representative value with a predetermined threshold representative value;
generating an adversarial noise warning signal if the calculated representative value falls below the predetermined threshold difference value; and
outputting the adversarial noise warning signal with the filtered signal and the confidence value.

17. A signal filter for filtering adversarial noise comprising:
a processor; and
a memory comprising machine readable instructions which, when read by the processor, cause the processor to perform the method of claim 1.

18. A non-transitory computer-readable storage medium comprising instructions which, when read by a processor, cause the processor to perform the method of claim 1.

19. A method for filtering adversarial noise, comprising:
receiving an input signal which comprises an unknown level of adversarial noise;
filtering the received input signal with a neural network to remove noise from the received input signal, thereby producing a filtered signal;
calculating a confidence value associated with the filtered signal, indicative of a level of trust relating to the filtered signal; and
outputting the filtered signal and the confidence value,
wherein the input signal comprises image data and calculating the confidence value comprises calculating uncertainty values for pixels within the image data.

20. A method for filtering adversarial noise, comprising:
receiving an input signal which comprises an unknown level of adversarial noise;
filtering the received input signal with a neural network to remove noise from the received input signal, thereby producing a filtered signal;
calculating a confidence value associated with the filtered signal, indicative of a level of trust relating to the filtered signal; and
outputting the filtered signal and the confidence value, wherein the method further comprises:
calculating a signature for the filtered signal; and
outputting the signature with the filtered signal.

* * * * *